United States Patent
Evans

(10) Patent No.: US 6,263,917 B1
(45) Date of Patent: Jul. 24, 2001

(54) MULTIPLE-BORE THROTTLE VALVE HAVING CENTRAL SHAFT END-PLAY RESTRAINT

(75) Inventor: David M. Evans, Mendon, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/373,145

(22) Filed: Aug. 12, 1999

(51) Int. Cl.[7] .................................................. E03B 1/00
(52) U.S. Cl. ........................ 137/595; 137/883; 137/887; 251/305; 251/308
(58) Field of Search .................................. 137/595, 887, 137/883; 251/305, 308

(56) References Cited

U.S. PATENT DOCUMENTS

| | | | |
|---|---|---|---|
| 4,308,805 | * 1/1982 | Spater | 137/375 |
| 4,747,942 | * 5/1988 | Strauss | 209/455 |
| 4,759,530 | * 7/1988 | Iff | 251/306 |
| 4,817,374 | * 4/1989 | Kitta | 60/313 |
| 5,427,141 | * 6/1995 | Ohtsubo | 137/595 |
| 5,535,718 | * 7/1996 | Nakai et al. | 123/336 |
| 5,630,571 | * 5/1997 | Kipp et al. | 251/214 |
| 5,632,304 | * 5/1997 | Kempka et al. | 137/595 |
| 5,655,500 | * 8/1997 | Kato | 123/336 |
| 6,047,950 | * 4/2000 | Pontoppidan et al. | 251/305 |

* cited by examiner

Primary Examiner—A. Michael Chambers
Assistant Examiner—Thomas L. McShane
(74) Attorney, Agent, or Firm—John A. VanOphem

(57) ABSTRACT

A multiple-bore throttle valve wherein the valve shaft is restrained from end play at a point between two of the flow bores. A passageway in the valve body between the flow bores intersects the valve shaft bore non-diametrically. The valve shaft has a circumferential groove at the point of intersection. A pin pressed into both the passageway and the groove axially restrains the shaft at that location. Since thermal expansion or contraction of the shaft in its axial direction can proceed only from the point of restraint, a dual-bore valve in accordance with the invention exhibits length changes in each bore equivalent to that of a single bore valve, which is less than half the shaft length change exhibited in at least one bore of a prior art dual-bore throttle valve. Similarly, a triple-bore valve exhibits expansion comparable to individual prior art single-bore and dual-bore valves, and a quadruple-bore valve exhibits expansion comparable to a prior art dual-bore valve.

11 Claims, 4 Drawing Sheets

MULTIPLE-BORE THROTTLE VALVE HAVING CENTRAL SHAFT END-PLAY RESTRAINT

TECHNICAL FIELD

The present invention relates to multiple-bore throttle valves, more particularly, to multiple-bore throttle valves wherein the throttle valve shaft is restrained from axial movement (also known as end-play) within the throttle body, and most particularly, to a dual-bore throttle valve wherein the valve shaft is restrained within the body at a position along the shaft between the valve bores.

BACKGROUND OF THE INVENTION

Throttle bodies for modulating the flow of gases are well known in, for example, the automotive art. A typical throttle valve comprises a valve body having a generally cylindrical bore for flow of gas, the bore being intersected generally diametrically by a rotatable shaft supporting a generally planar valve head capable of closing or opening the bore when the shaft is rotated to extremes, and also of modulating flow through the bore at rotational positions in between. The valve head may be elliptical in plan view such that the valve head can close the bore when rotated to an angle less than orthogonal to the axis of the bore, to prevent sticking of the valve head in the bore at the occluded position.

In some applications, for example, in throttling the exhaust gas stream of a diesel engine as part of an assembly for exhaust gas recirculation (EGR), two parallel-mounted throttle valves are required which are commonly provided as dual bores in a common valve body with a common shaft intersecting both bores and a valve head disposed on the shaft in each bore, such that the flow performance of the two valves is identical with rotation of the shaft. Of course, the bores may be of different diameters or cross-sectional shapes as required for any particular application.

In known throttle valves, the shaft is retained in the valve body by shaft axial restraining means outboard of the gas flow bore or bores and near an end of the shaft. This construction is known in the art for both single-bore and multiple bore throttle valves.

Use conditions for throttle valves, especially temperatures of use, may be very different from the ambient conditions under which they are manufactured, and valve components may expand or contract accordingly. In throttle valves constructed in accordance with the prior art, thermal expansion of the valve shaft is unidirectional from the shaft restraining means, and is cumulative therefrom. For single-bore valves, the misfit of the valve head in the bore caused by thermal changes can be acceptable because the shaft length is short relative to the diameter of the bore. However, for some dual-bore valves, and especially for diesel EGR valves which may be required to function properly between start-up temperatures of −30° C. or lower and equilibrium temperatures of 800° C. or higher, thermal shaft length changes can be great enough to cause the valve head farther from the restraining means to bind in its bore and fail to modulate the flow of gas therein as intended. Such failure, of course, causes an identical linked failure in the near bore as well. For triple-bore valves, the problem becomes proportionally more severe.

What is needed is a improved means for restraining end play of a valve shaft in a multiple-bore valve such that thermal expansion of the shaft from the point of restraint is insufficient to prevent the valve from proper function.

SUMMARY OF THE INVENTION

The present invention is directed to an improved multiple-bore throttle valve wherein the valve shaft is restrained from end play at a point between two of the bores. Since thermal expansion or contraction of the shaft in the axial direction thereof can proceed only from the point of restraint, a dual-bore valve having shaft restraint in accordance with the invention exhibits length change in each bore equivalent to that of a single bore valve, which is less than half the shaft length change exhibited by a prior art dual-bore throttle valve. Similarly, a triple-bore valve having a single shaft in accordance with the present invention exhibits expansion comparable to individual prior art single-bore and dual-bore valves, and a similar quadruple-bore valve exhibits expansion comparable to two individual prior art dual-bore valves.

In a dual-bore valve in accordance with the invention, the performance of both valves is substantially identical because the shaft expands and contracts symmetrically in the axial direction from a substantially central point, and thermally-caused errors in length, therefore, are cumulative over only half the length of the shaft.

BRIEF DESCRIPTION OF THE DRAWINGS

The foregoing and other objects, features, and advantages of the invention, as well as presently preferred embodiments thereof, will become more apparent from a reading of the following description, in connection with the accompanying drawings in which.

DESCRIPTION OF THE PREFERRED EMBODIMENT

Figure 1:
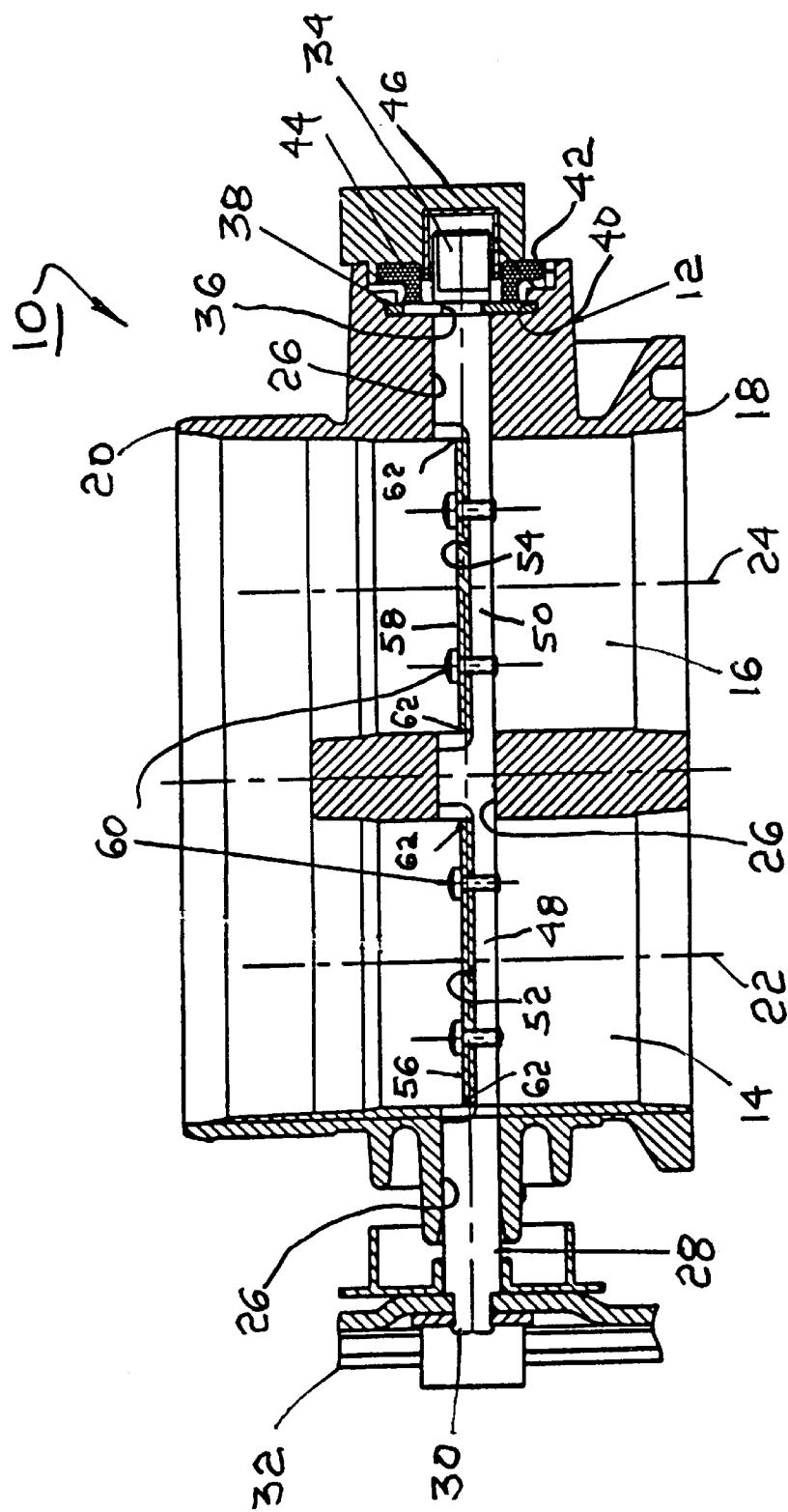
FIG. 1 is an elevational cross-sectional view of a prior art dual-bore throttle valve, showing axial restraint of the valve shaft near one end thereof, outboard of the bores.

Referring to FIG. 1, a prior art dual-bore throttle valve 10 has a valve body 12 having first and second parallel bores 14,16 between lower surface 18 and upper surface 20 for the passage of gas or other fluid therethrough. Bores 14,16 are typically cylindrical, having axes 22,24 respectively. A third bore 26 through body 12 intersects bores 14,16 substantially orthogonally and diametrically.

Rotatably disposed within third bore 26 is a valve shaft 28, provided at a first end 30 thereof with operating linkages 32 for rotating shaft 28 as desired. Near the opposite end 34 and within body 12, shaft 28 is provided with a circumferential groove 36 for receiving an asymmetric washer 38. Third bore 26 is further provided with larger diameter steps 40,42 for receiving washer 38, seal 44, and end cap 46. Washer 38 is retained in bore step 40 as by mechanical staking of the step. Washer 38 is thus fixed in body 12. Shaft 28 is freely rotatable within washer 38 and bore 26.

The portions 48,50 of shaft 28 disposed within bores 14,16, respectively, are provided with flats 52,54 on a chord of shaft 28 for receiving first and second valve heads 56,58, respectively, secured to shaft 28 as by screws 60. Valve heads 56,58 are substantially planar and may be circular or elliptical in plan view, and typically are disposed concentrically with their respective bores such that when shaft 28 is rotated to the position shown in FIG. 1, valve heads 56,58 substantially occlude bores 14,16, respectively. At other rotational angles of shaft 28, bores 14,16 are partially opened. Control of the angle of rotation of shaft 28 as desired enables throttle valve 10 to modulate the flow of gas or other liquid through bores 14,16.

Axial motion of shaft 28 in bore 26 is restrained by washer 38 in groove 36. Thus groove 36 is fixed axially within body 12, therefore all thermal expansion or contraction of shaft 38 between groove 36 and end 30 must be expressed as cumulative change in shaft length proportional to the distance along shaft 28 from groove 36.

As the length of shaft 28 changes progressively from thermal expansion or contraction, valve heads 56,58 are displaced by shaft 28 into positions progressively farther from concentricity with their respective bore axes. Because the deformation of shaft 28 is cumulative from groove 36, the progressive loss of concentricity will be greater in bore 14, its being farther from the point of shaft restraint at step 40. Typically, the circularity of each valve head is truncated 62 by a chord over the portions of the valve head near the valve shaft to permit some axial distortion or float. However, with sufficient axial deformation of shaft 28, the allowable distortion or float can be exceeded, and either of, or both, valve heads 56,58 can be forced into binding interference with the wall of the respective bores, preventing proper and intended throttling action of the valve.

Figure 2:
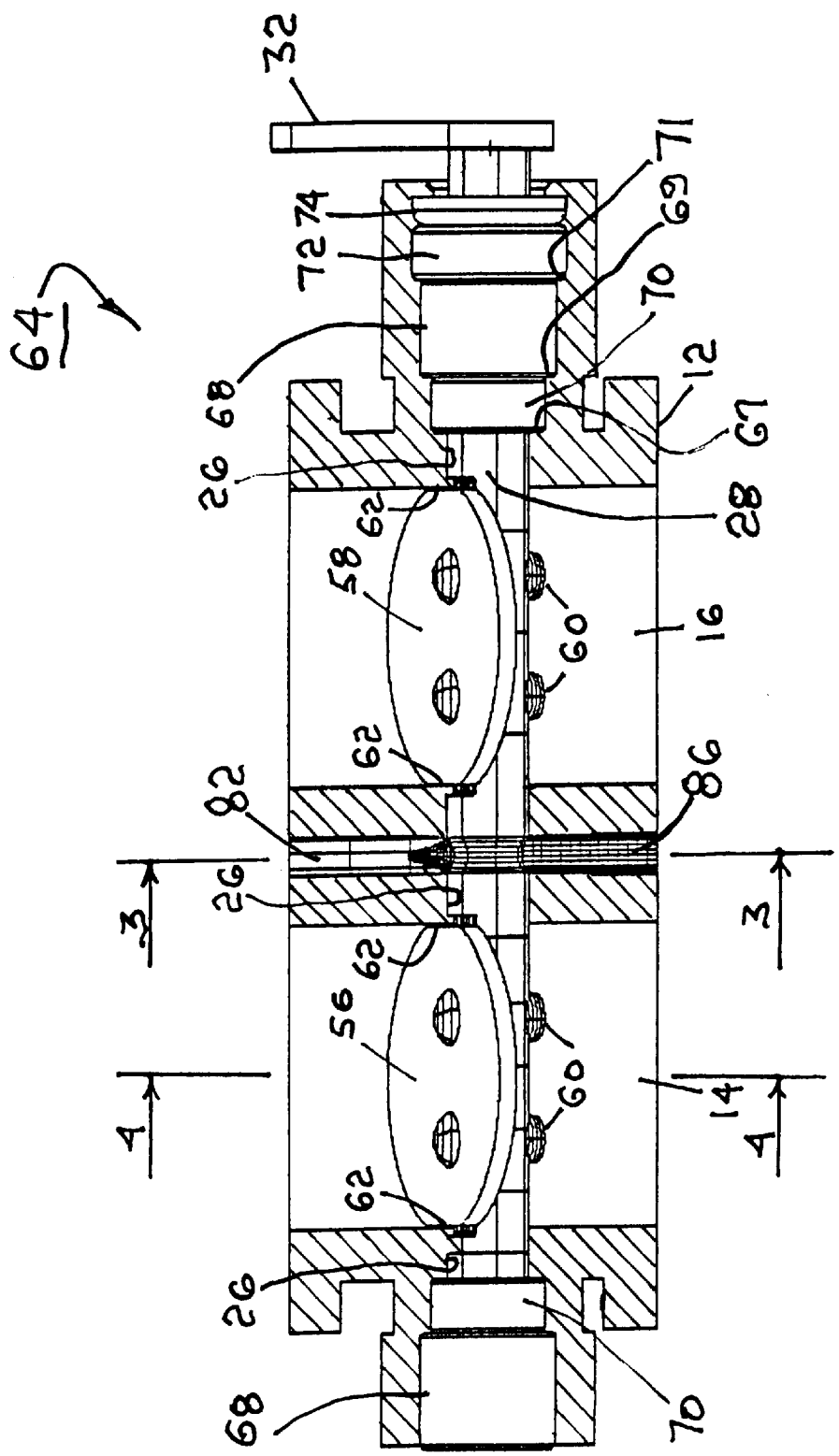
FIG. 2 is an elevational view, partially in cross section, of a dual-bore throttle valve in accordance with the invention, showing axial restraint of the valve shaft at a generally central location thereof, between the bores.
Figure 3:
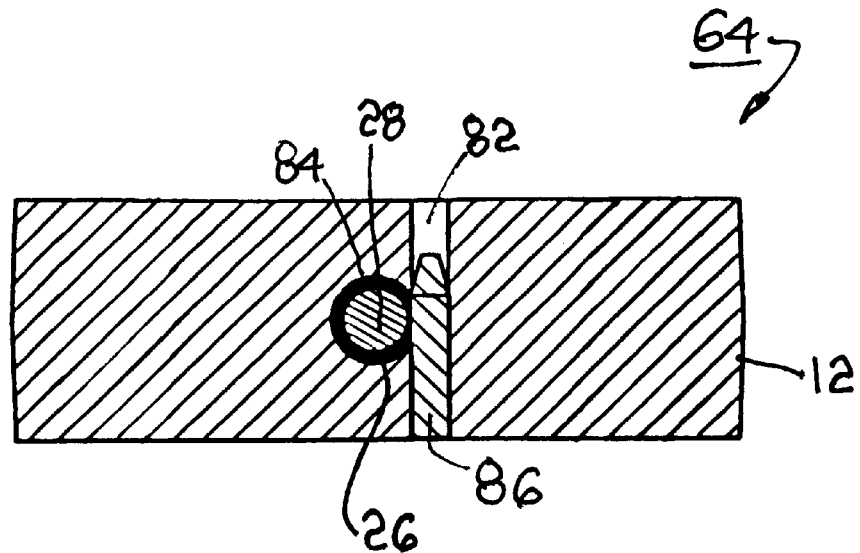
FIG. 3 is a cross-sectional view taken along line 3—3 in FIG. 2.
Figure 4:
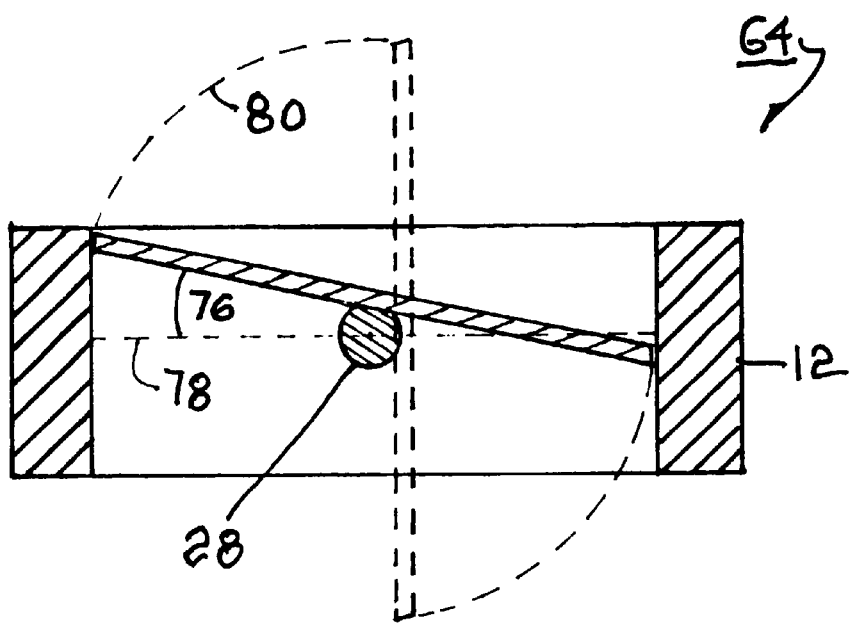
FIG. 4 is a cross-sectional view taken along line 4—4 in FIG. 2.

Referring to FIGS. 2–4, a dual-bore throttle valve 64 in accordance with the invention is generally similar in construction and function to valve 10. Valve 64 has a valve body 12 having first and second parallel bores 14,16 between lower and upper surfaces 18,20 of valve body 12. A third bore 26 intersects bores 14,16 substantially orthogonally and diametrically. A valve shaft 28 is rotatably disposed within bore 26, and may be journalled by bushings 68 at the ends of shaft 28. Preferably, shaft 28 is also fitted with shaft seals 70 of known construction for isolating bushings 68 in respective valve body steps 67,69,71 in bore 26 from gases or other fluids flowing through bores 14,16 during use of valve 64, which gases or other fluids may be corrosive or otherwise damaging to the bushings. Further, an outer seal 72 may be provided to exclude dust from the bushings, and the assembly of bushing and seals may be retained on shaft 28 as by a conventional retainer 74 pressed into step 71. Shaft 28 may be further provided with linkage means 32 for rotational actuation of shaft 28. Shaft 28 is not restrained from axial motion by any of the recited bushings, seals, and retainer.

As in prior art valve 10, first and second valve heads 56, 58 are centrally disposed in their respective bores 14,16 and are secured to flats 52,54, respectively, as by screws 60. Heads 56,58 also are preferably provided with truncations 62 of their curved outlines to facilitate rotation of the valve heads within their respective bores.

Valve heads 56,58 may be circular in plan view, but preferably each is elliptical such that, when fully occluding its bore, each intersects its respective bore walls at an acute closing angle 76, as measured from the diameter 78 of the bore, of preferably between about 10° and about 30°, and preferably about 20°, as shown in FIG. 4. Of course, the valve heads are also preferably rotatable through the complementary angle 80 to fully open each bore for flow.

Between bores 14,16, valve body 12 is provided with a passageway 82 which is preferably a cylindrical bore and which intersects third bore 26 non-diametrically, as shown in FIGS. 2 and 3. Passageway 82 may, of course, have any desired cross-sectional shape. Shaft 28 is provided with a circumferential groove 84, which may have any desired cross-sectional profile and preferably is semicircular, at the location of passageway 82 for receiving a shaft axial restraining means 86, which is also preferably cylindrical to match the preferred passage shape and of substantially the same radius as groove 84, and which may take the form of a pressed pin, as shown in FIGS. 2 and 3, or a roll pin, bolt, screw, or any other mechanical element capable of insertion into both bore 82 and groove 84 for the purpose of axially restraining shaft 28 at the location of passageway 82 without restricting the rotatability of shaft 28.

In operation, as the temperature of shaft 28 departs from the assembly temperature of valve 64, shaft 28 undergoes axial deformation, either extension or contraction, in response to the thermal change imposed. However, in contrast to prior art valves, as exemplified by valve 10 shown in FIG. 1, wherein all shaft length change is cumulative from a point outboard of bores 14,16, in valve 64 in accordance with the invention, all shaft length change is cumulative from a point between the two bores. Thus both bores experience substantially the same shaft length change, which is substantially the change experienced by only bore 16 in prior art valve 10, and bore 14 experiences approximately one-half the shaft displacement of valve head 56 experienced in prior art valve 10, thus permitting a dual-bore valve in accordance with the present invention to operate over a wider range of temperatures than can a prior art dual-bore valve.

Figure 5:
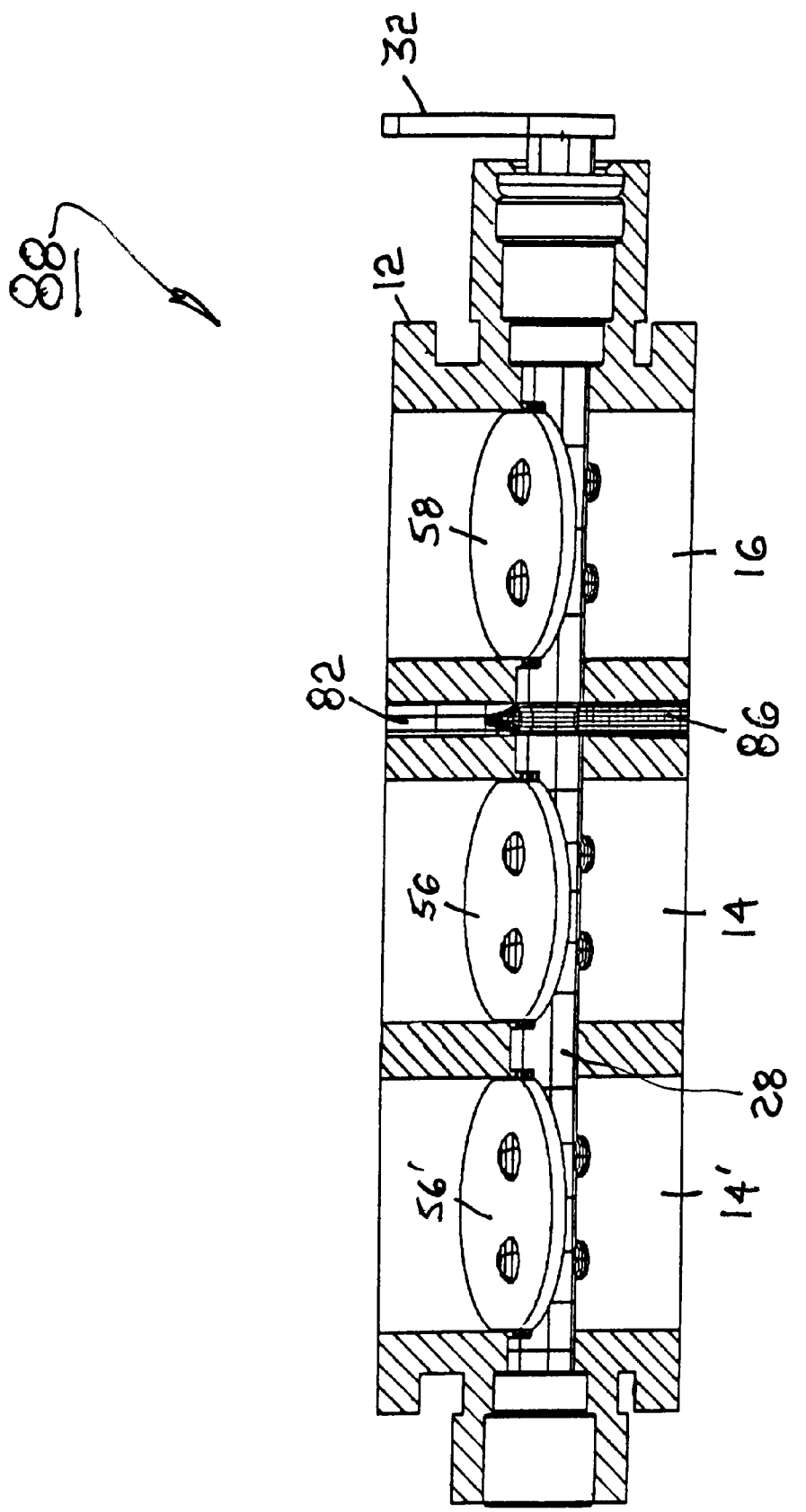
FIG. 5 is a view like that shown in FIG. 2, showing a triple-bore throttle valve in accordance with the invention.

Plural-bore valves having even more parallel flow bores can similarly benefit from construction in accordance with the present invention. For example, a triple-bore valve 88, as shown in FIG. 5, which might well be impractical for some applications when constructed in accordance with the prior art, experiences only the shaft axial deformation of prior art individual single bore and dual-bore valves; and a quadruple-bore valve (not shown) behaves like two prior art dual-bore valves.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A throttle valve, comprising:

a) a valve body;

b) a plurality of parallel bores through said body for permitting flow of a plurality of gas streams through said body;

c) a further bore in said body intersecting each of said parallel bores;

d) a shaft rotatably disposed in said further bore, said shaft intersecting and extending through each of said parallel bores;

e) at least one valve head mounted on said shaft for rotation therewith in a corresponding one of said plurality of bores for modulating the flow of gas therethrough; and f) means for axially restraining said shaft at a location in said valve body between any two of said plurality of parallel bores.

2. A throttle valve in accordance with claim 1 wherein the number of said plurality of bores is selected from the group consisting of two, three, and four.

3. A throttle valve in accordance with claim 1 further comprising a plurality of valve heads, each disposed in a one of said plurality of bores, all of said valve heads being mounted to said shaft.

4. A throttle valve, comprising:
a) a valve body;
b) a plurality of parallel bores through said body for permitting flow of a plurality of gas streams through said body;
c) a further bore in said body intersecting each of said parallel bores;
d) a shaft rotatably disposed in said further bore;
e) at least one valve head mounted on said shaft for rotation therewith in a corresponding one of said plurality of bores for modulating the flow of gas therethrough; and
f) means for axially restraining said shaft at a location in said valve body between any two of said plurality of parallel bores, said means for axially restraining comprising a passageway in said valve body intersecting said further bore for said shaft at an intersection, a groove in said shaft at the location of said intersection, and an element disposed in said passageway and extending into said groove for axially restraining said shaft at said location, said element being selected from the group consisting of a pressed pin, roll pin, bolt, screw, any other mechanical element capable of insertion into both said passageway and said groove, and combinations thereof.

5. A throttle valve, comprising:
a) a valve body;
b) a plurality of parallel bores through said body for permitting flow of a plurality of gas streams through said body;
c) a further bore in said body intersecting each of said parallel bores;
d) a shaft rotatably disposed in said further bore;
e) at least one valve head mounted on said shaft for rotation therewith in a corresponding one of said plurality of bores for modulating the flow of gas therethrough; and
f) means for axially restraining said shaft at a location in said valve body between any two of said plurality of parallel bores, said means for axially restraining comprising a passageway in said valve body intersecting said further bore for said shaft at an intersection, a groove in said shaft at the location of said intersection, said groove being substantially semicircular in cross-sectional profile and said element being substantially cylindrical and of substantially the same radius as said groove, and an element disposed in said passageway and extending into said groove for axially restraining said shaft at said location, said element being selected from the group consisting of a pressed pin, roll pin, bolt, screw, any other mechanical element capable of insertion into both said passageway and said groove, and combinations thereof.

6. A throttle valve in accordance with claim 1 wherein at least one of said plurality of bores is generally cylindrical in shape.

7. A throttle valve in accordance with claim 1 wherein the shape of said valve head is selected from the group consisting of circular and elliptical.

8. A throttle valve in accordance with claim 7 further comprising at least one truncation of said shape.

9. A throttle valve in accordance with claim 1 wherein the closing angle of said valve is between about 10° and about 30°.

10. A throttle valve in accordance with claim 9 wherein said closing angle is about 20°.

11. Apparatus for restraining a rotatable shaft in a bore in a body, comprising:
a) a passageway in said body intersecting said bore at an intersection;
b) a groove in said shaft at the location of said intersection; and
c) an element disposed in said passageway and extending into said groove for axially restraining said shaft at said location, said element being selected from the group consisting of pressed pin, roll pin, bolt, screw, any other mechanical element capable of insertion into both said passageway and said groove, and combinations thereof.

* * * * *